United States Patent [19]

Huff

[11] 4,062,340

[45] Dec. 13, 1977

[54] OUTDOOR GRILL

[75] Inventor: George L. Huff, Greenville, Tenn.

[73] Assignee: Metals Engineering Incorporated, Greenville, Tenn.

[21] Appl. No.: 719,936

[22] Filed: Sept. 2, 1976

[51] Int. Cl.² .......................... A47J 37/00; F24B 3/00
[52] U.S. Cl. ................................. 126/25 R; 16/179; 220/335
[58] Field of Search .................. 126/25 R, 25 A, 9 R, 126/9 B; 217/60 R, 60 E; 220/335, 333; 248/354 S; 16/138, 142, 145, 179, 191; 49/248; 85/37; 99/446

[56] References Cited

U.S. PATENT DOCUMENTS

| | | | |
|---|---|---|---|
| 1,059,221 | 4/1913 | Saylor | 49/248 X |
| 2,791,348 | 5/1957 | Adams | 220/333 |
| 2,850,760 | 9/1958 | Van Der Walker | 220/333 X |
| 2,926,399 | 3/1960 | Ramunas | 49/248 |
| 3,931,805 | 1/1976 | Nelson | 126/25 R X |
| 3,938,493 | 2/1976 | Bauer | 126/25 R X |

FOREIGN PATENT DOCUMENTS

| | | | |
|---|---|---|---|
| 1,431,104 | 1/1966 | France | 85/37 |
| 824,780 | 12/1959 | United Kingdom | 49/248 |

Primary Examiner—William F. O'Dea
Assistant Examiner—Harold Joyce

[57] ABSTRACT

A hinge is provided for pivotally connecting the bowl and cover of a substantially rectangular portable outdoor grill for cooking. The grill hinge comprises two sets of two hinge members, each set being pivotally attached to opposing sides of the grill. The hinge members are interchangeable between the "left-hand" and "right-hand" sides of the grill. The first and second hinge members of each set pivot in spaced relation to one another between closed and open positions of the cover. When in the open position, the first hinge member of a set bears upon the grill bowl and the second hinge member of the set bears upon the first hinge member over a substantial area to hold the cover in a desired open position.

9 Claims, 5 Drawing Figures

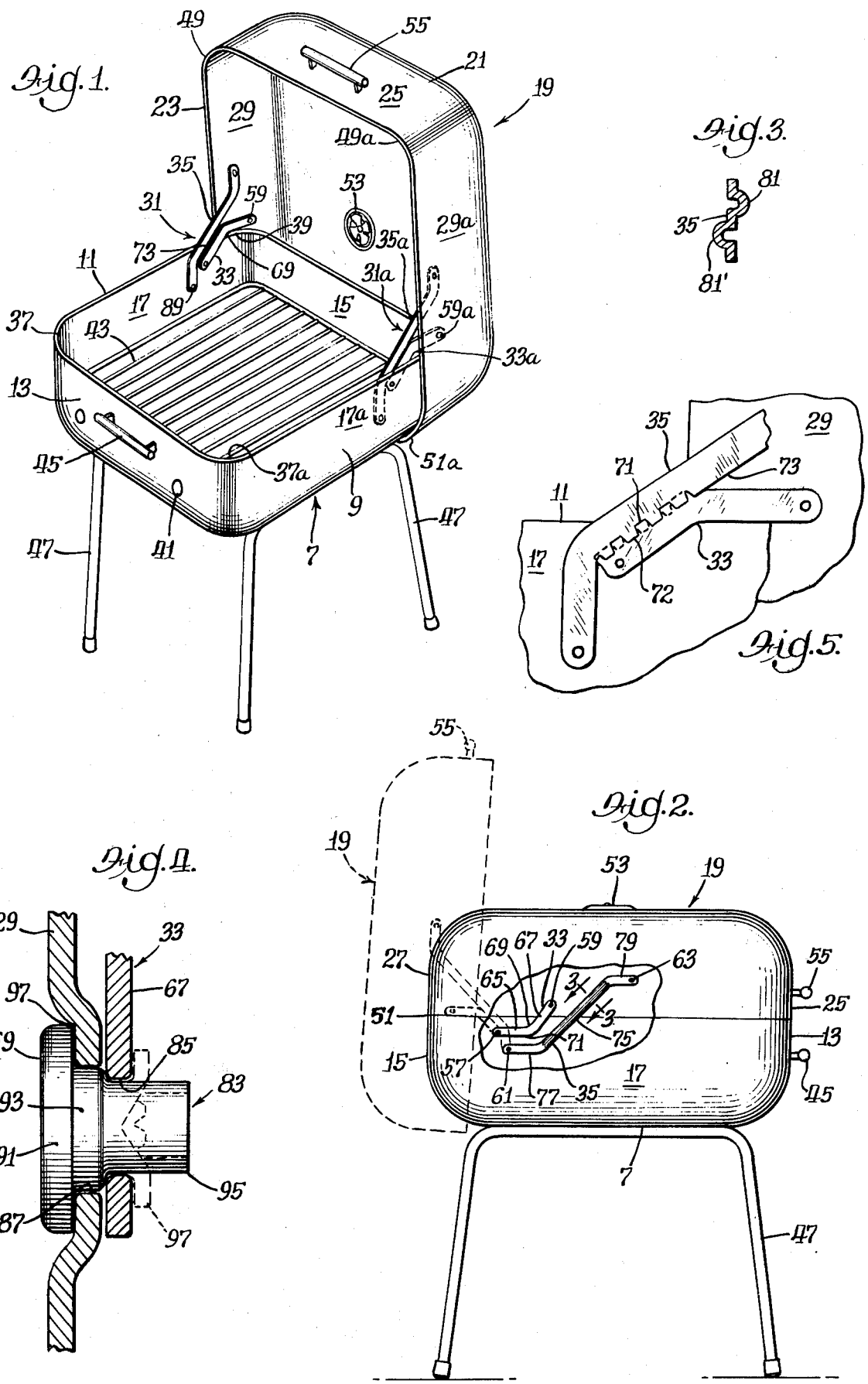

OUTDOOR GRILL

This invention relates to outdoor grills of the covered type. More particularly, it relates to an improved hinge means for connecting a grill bowl section to a mating grill cover section.

In outdoor grills, it is often desired that the grill have a hinged cover section to protect the grill from the elements and so that it can be used for covered cooking. Prior to the present invention, a variety of hinge means have been used for outdoor (barbecue) grills. One such hinge means is a pintle and gudgeon type of hinge combined with a stop affixed to the bowl or cover to limit rearward motion of the cover. However, with this type of hinge, the cover is not adequately stable in the open position as prevents its inadvertent closing as by a gust of wind or by a bump from a passerby.

Another prior hinge means employs rods, the ends of which are bent and seated in sockets in the grill base and cover or attached by push nuts. This type of hinge means holds the cover in a position such that in its open position, the cover has its lower edge below the upper edge of the bowl thereby enhancing its stability when open. When closing the cover with such a hinge, the cover is simultaneously lifted and pulled forwardly. However, the push nuts or sockets on the outer surface of the grill make cleaning difficult and in the case of the push nuts, they tend to work off the rod ends, thus allowing the rods to disengage thereby impairing the reliability of the grill. In addition, the attachment method of bent tips and push nuts or sockets makes each rod "right-handed" or "left-handed" and, thus, not interchangeable from one side to the other. This is undesirable from the manufacturing point of view.

It is therefore an object of this invention to provide an economical barbecue grill hinge means which will hold the cover open in a reliable and stable manner, provide an essentially smooth outer grill surface for cleaning, and require fewer distinct parts.

Other benefits and advantages of the invention will become apparent from the drawings and the following description.

FIG. 1 is a perspective view of a barbecue grill with hinge means embodying various of the features of the invention;

FIG. 2 is a side elevational view, partly in section of the grill shown in FIG. 1 (The position of the grill and cover in the open position being shown in dotted outline);

FIG. 3 is a sectional view taken along line 3-3 in FIG. 2;

FIG. 4 is a fragmentary, sectional view showing pivot means including a rivet for attaching the hinge means to the grill (the deformed position of the rivet being shown in dotted outline).

FIG. 5 is a fragmentary showing an alternative embodiment of the hinge means shown in FIG. 1.

The barbecue grill illustrated in the drawings includes a generally rectangular bowl 7 having around its periphery an upstanding flange 9, including an upper edge 11, and defining a front wall 13, a rear wall 15, and two side walls 17 and 17a. The bowl 7 is provided with a mating grill cover 19 having a depending flange 21 around its periphery including a lower edge 23, and defining a front wall 25, a rear wall 27 and two side walls 29 and 29a, respectively. The bowl 7 and the cover 19 are hingedly interconnected by hinge sets 31 and 31a attached to the opposite sides of the barbecue grill. As illustrated, hinge sets 31 and 31a connect side walls 17 and 29 and 17a and 29a, respectively. The hinge sets 31 and 31a are proportioned and arranged so that when the front wall 25 of the cover 19 is lifted, the cover swings generally about the rear wall 15 of the bowl until it reaches the preset fully open position, at which point the hinge sets 31 and 31a provide a seat for the cover 19 with respect to the bowl 7.

As illustrated, each hinge set 31 and 31a includes a pair of hinge members 33, 35 and 33a, 35a, respectively. When in the fully open position, the first member 33, 33a, of each hinge set rests upon the upper edge 11 of the upstanding flange 9 of the bowl 7 and each of the hinge members 35, 35a, of each hinge set engages its corresponding first member 33 or 33a, over a substantial portion of the length of the member 33 or 33a, so as to provide a further stable rest or seat for the open cover 19. Additionally, the respective length of the members of each hinge set are selected such that when the hood is in its fully open position, the hood is "over center" with respect to the bowl. These features minimize the possibility of inadvertent closing of the cover 19 and also minimize twisting forces which might warp the cover relative to the bowl 7.

Now referring to the illustrated grill in detail, the bowl 7 is generally rectangular in outline, as illustrated. The bowl 7 includes the upstanding peripheral flange 9 which extends around the periphery of the bowl with rounded corners 37, 37a, 39 and 39a. The bottom of the bowl 7 is provided with the usual air vents 41 to permit air flow to the charcoal or other heating source. An adjustably mounted grill rack 43, to hold the food being cooked, is supported in the bowl, in the usual manner, and a suitable handle 45 is attached to the front of the bowl 7 to aid in transporting the grill. The bowl 7 is mounted on the usual legs 47, or wheels, as desired.

The grill cover 19 is also rectangular in outline and is provided with the downwardly depending flange 21 which includes rounded corners 49, 49a, 51 and 51a, as illustrated. The dimensions and outline of the flanges 9 and 21 are substantially identical so that the cover and bowl can meet in mating relationship. As desired, a shoulder is provided on the lower edge 23 of the cover 19 to mate with the upper edge 11 of the bowl and define a seal therebetween. The cover 19 is provided with an air vent 53 and the forward wall 25 is supplied with a suitable hand grip 55.

As pointed out generally above, the bowl and cover are hingedly attached adjacent their rearward sides 15 and 27 respectively, as illustrated. The hinge means comprises the two sets of hinges 31 and 31a, one of which is disposed on each of two opposite sides of the grill. Since the two sets 31 and 31a are identical, only set 31 will be described in detail and the parts of the other set 31a will be identified with the same reference numerals with the suffix "a".

In order to clarify the description of the hinge set 31, it is desirable to first describe the position of the set when the bowl 7 and cover 19 are in the fully open position, the position in which the support provided by the hinge means is of greatest importance.

The preferred fully open position, shown in phantom in FIG. 2, is one in which the bowl 7 is substantially horizontal and the cover 19 is pivoted rearwardly relative to the rear grill wall 15 to an overbalanced position in which the cover flange wall 27 is at about the level of the bottom of the bowl 7. In the open position, the bowl 7 and cover 19 are not in direct contact.

The hinge set 31 comprises two elongated hinge members 33 and 35 and four attaching pivot means 57, 59, 61 and 63. In the fully open position, the first hinge member 33 is principally responsible for supporting the weight of the cover 19. The member 33 includes two end sections 65 and 67, the outboard end of the end section 65 being pivotally attached to the bowl side wall 17 by the pivot means 57 and the outboard end of the other end section 67 being pivotally attached to the cover side wall 29 by pivot means 59. The proportions of the end sections 65 and 67 and the position of the pivot means 57 and 59 are such that a substantial area of the surface 69 of the end section 67 of the hinge member 33 bears upon the upper edge 11 of the upstanding bowl flange 9 at the rounded corner 37 when cover is in the open position.

As shown in FIGS. 1 and 2, the preferred embodiment of the first hinge member 33 is fabricated from substantially rigid stock and is generally planar, the two end sections 65 and 67 forming an obtuse angle with one another. This general shape not only has the advantage of bearing upon the upper edge 11 of the upstanding flange 9 of the bowl 7 but also provides that the lower surface 69 of the end section 67 is horizontally positioned when in the fully open position thereby assuring maximum contact with the flange 9 so as to distribute the grill cover weight over a substantial area of the horizontal edge 11 of the bowl, thus diminishing wearing effects or damage to the flange by reason of harsh contact therewith by the hinge member 33. As may be noted from FIG. 1, the area of contact between the first hinge member 33 and the bowl flange edge 11 is also influenced by the first hinge members's position with respect to the rounded corner 39 of the flange edge 11. The optimum portion of the bowl flange 9 for contact is that portion at which the side wall 17 begins to curve to meet the rear wall 15. This provides an extended contact between the upper edge 11 of the bowl flange 9 and the lower surface 69 of the member 33 so as to stabilize the fully open bowl cover 19. Additionally, the bowl edge may be reinforced in the area of contact in order to inhibit wearing.

The end section 65 of the member 33 is provided with a substantially flat surface 71 upon which the second hinge member 35 bears when the cover is in the fully open position as will be described.

As noted previously, in the fully open position the cover 19 is overbalanced and therefore tends to rotate about the axis of the pivot means 59 and 59a. To prevent this rotation the second member 35, having a central section 75 and two end sections 77 and 79, is pivotally attached at the outboard end of end section 77 thereof to the side wall 17 by the pivot means 61 and at the outboard end of the other of its end sections 79 to the side wall 29 by the pivot means 63. The positions of the pivot means 61 and 63 and the shape of the second hinge member 35 are selected so that a substantial area of the surface 73 of the second hinge member 35 bears upon the surface 71 of the first hinge member 33 when the cover 19 is in the fully open position. In the embodiment shown in FIG. 1, the width of the area of contact between the surfaces 71 and 73 is limited by the depth of the hinge members 33 and 35. Alternatively, as shown in FIG. 5, the contacting area, and thus stability of the cover with respect to the bowl, may be increased by including in the central section 75 of a plurality of tabs 72 extending out of the general plane of the central section 75 toward alternating sides of the plane. The tabs 72 may be easily formed by stamping slits inwardly from the surface 73 and pressing the tabs thus formed in alternating directions out of the general plane of the central section 75. The tabs 72 preferably extend over the length of surface 73 which contacts surface 71 to be most effective. If required by reason of the projecting tabs developing interference with rotating movement of the hinges, the pivot means 57, 59, 61 and 63 may be altered to space the hinges apart from their respective wall and/or from each other. It will be noted that the tabs 72 provide an additional function of inhibiting lateral motion, of the hinge members 33 and 35, thereby stabilizing the cover with respect to the bowl. The preferred hinge members 33 and 35, as depicted in FIGS. 1 and 2, are provided with longitudinal corrugations 81 and 81' for reinforcement against bending under the weight or force of the lid when in its open position thereby allowing these members to be made of a lighter weight and less expensive material. This is particularly true of the second hinge member 35. These corrugations are depicted in FIGS. 2 and 3.

The pivot means 57, 59, 61 and 63 are substantially identical so that only one pivot means 59, the one attaching end section 67 to the side wall 29, will be described in detail. The pivot means 59 includes a rivet 83, received in a generally circular hole 85 in the end section 67 of the hinge member 33 and in a generally circular indented hole 87 in the flange wall 29 that is in register with the hole 85.

As shown by way of example in FIG. 4, a preferred embodiment of the rivet 83 includes a head 91 coaxially joined to a solid shaft section 93 of relative large diameter, which in transmits into a coaxial hollow tubular section 95 of smaller diameter. The large diameter of shaft 93 is provided as a bearing surface to minimize wear. However, the diameter is decreased for the tubular shaft 95 which penetrates the hole 85 so that the member 33 is held between the solid shaft section 93 and a deformed tubular shaft 97 (shown in dotted outline in FIG. 4).

Attachment is accomplished by inserting the tubular section 95 of the rivet through the flange hole 87 and through the hinge member hole 85, then deforming the tubular section 95 to fix the rivet 83 with respect to to the hinge member 33. The rivet 83 is proportioned so that the head 91 is wider than the flange hole 87, yet narrower than the indented area 97 surrounding the hole 87 so that it is seated within the indented area 97 without passing through the flange hole 87. The width shaft section 93 fits rotatably within the flange hole 87 and the deformed tubular section 95 holds the hinge member 33 so that it can pivot about the rivet axis, yet cannot wobble with respect to the rivet 83.

The pivot means 63 is identical to pivot means 59. In the pivot means 57, an indented rectangular slot 89 generally parallel in its longer dimension with the bowl flange edge 11 replaces the generally circular hole 85. The slot 89 is used in place of the generally circular hole 85 in order to allow the cover 19 to be shifted slightly when closing. In the course of manufacturing, certain tolerances are allowed which may accumulate in a given grill, thus requiring a slight freedom of movement to insure a good seal between the bowl 7 and closed cover 19.

Also important in determining the proper dimensions and positions of the hinge members 33 and 35 in consideration of their location when the cover 19 is in a closed position, and their relative motion while the cove 19 is being opened or closed.

The desired closed position is that position in which the bowl flange 9 and cover flange 21 matingly join, cooperatively forming an essentially sealed container (except for the previously mentioned vents 41 and 53). Therefore, as FIG. 2 shows by way of example, the hinge members are proportioned, shaped and positioned in such a manner that the operator may place the cover 19 in the desired closed position without exerting downward force.

The particular dimensions and the position of the pivotal attachment means 57, 59, 61 and 63 for the hinge member end sections 65, 67, 77 and 79, respectively, depend upon the particular grill upon which they are attached. By way of example, the grill depicted in FIGS. 1 and 2 includes a bowl 7 and cover 19, each of which is 20 inches square and six inches deep. The linear portion of each side is about twelve inches long, the rounded corners completing the width. The first hinge member 33 is 3¼ inches from the pivotal axis of attachment means 57 to the pivotal axis of attachment means 59 and the end sections 65 and 67 define an angle of about 130 degrees with one another. The end section 65 is about 1½ inches long and the end section 67 is about 2 inches long. The position of the pivotal axis of the attachment means 57 is ¾ inch below the flange edge 11 and 4½ inches from the rear wall 15. The position of the pivotal axis of the attachment means 59 is 8/10 of an inch above the flange edge 23 and seven inches from the rear wall 27.

The second hinge member 35 in this embodiment is 7¼ inches from the pivotal axis of the attachment means 61 to the axis of the attachment means 63. The end sections 77 and 79 are parallel and each defines an angle of about 140° with the intermediate section 75. The position of the pivotal axis of the attachment 63 is 1⅝ inches above the flange edge 23 and twelve inches from the rear wall 27. The position of the pivotal axis of the attachment means 69 is 1¾ inches below the flange edge 11 and five inches from the rear wall 15.

During opening and closing, the first hinge member 33 and the second hinge member 35 do not interfere with one another. They contact one another only when the cover 19 is in the fully open position. Their shapes and positions are influenced by this factor also.

It has been found that the disclosed hinge means holds the grill cover in a more stable fully open position because the high number of contact points between the cover, the base, and hinge members combine to create an effectively single unit. An additional benefit of the substantial contact area is that the amount of weight of the cover supported by a single point is decreased. Wearing effects are thus diminished.

The disclosed means attaching the hinge sets a substantially smooth outer surface which is both attractive and easily maintained because the rivet heads are recessed in the indents. These indents have the additional advantage of maintaining the hinge members in a spaced relationship with the inner surfaces of the bowl and cover, thus minimizing parts that can be used either as left or right-handed hinges.

By including deformable rivets, the attaching means is permanent and, therefore, reliable. The wide solid section of the shaft serves to minimize wearing effects by enlarging the bearing surface.

What is claimed is:

1. In a barbecue grill which includes a grill bowl section which is substantially rectangular in outline, having a front, a rear and two sides, and which has an upstanding flange around its periphery, a mating cover section for said grill bowl having a depending flange around its periphery and hinge means for pivoting said cover relative to said grill bowl, the improvement comprising hinge means which include two spaced apart hinge member sets, one of such sets being associated with each of said sides of said upstanding flange, each of said hinge member sets including an elongated first hinge member, including two integral ends and an upper and lower surface and having one end portion pivotally attached to the associated side of said upstanding flange and the other end portion pivotally attached to the mating side of the depending flange, the lower edge of said first hinge member bearing upon the upper surface of said upstanding flange when the cover is in the fully open position and the rearward end of said cover is below the level of the upper surface of said upstanding flange, the upper surface of said first hinge member being provided with a generally planar section, an elongated second hinge member including opposite integral end portions, an intermediate portion and an upper surface and a lower surface, having one of its end portions pivotally attached to said associated upstanding flange and its other end portion attached to said depending flange, and pivotal attachment means connecting said hinge members to their respective flange members, the points of pivotal attachment being positioned so that said intermediate portion of said second hinge member bears upon said generally planar section of said first hinge member when said cover is in the fully opened position, the lengths of said hinge members and the positions of said pivot points being such that the flanges of the grill base section and the cover section mate when the cover is in the fully closed position.

2. A grill hinge means as defined in claim 1, wherein said first hinge member is generally angular within a plane parallel to the plane generaly defined by said upstanding and depending flange.

3. A grill means as defined in claim 1 wherein said second hinge member end portions are offset, extending at obtuse angles from said intermediate portion, said angles being within a plane parallel to a plane defined generally by said upstanding and depending flanges.

4. A grill as defined in claim 1 wherein said attachment means includes an indented opening within said cover flange or said bowl flange and a rivet, including a head, a solid shaft portion and a tubular shaft portion, and wherein said head is seated within said indented area, said solid shaft portion is seated within said opening, and said rivet is fixed to said first member or second member by deforming said tubular shaft portion after penetrating the end portion of a hinge.

5. A grill as defined in Claim 4 wherein said opening in said bowl flange comprises an elongated opening, the greater dimension of said opening being generally parallel to the upper edge of said bowl flange.

6. A grill as defined in claim 1 wherein one of said hinge members of a hinge member set includes laterally projecting tab means in the region thereof that contacts the other of said hinge members of said set when said cover section is in its open position with respet to said bowl section.

7. A grill as defined in claim 6 wherein said laterally projecting tab means comprises a plurality of projections extending out of the plane of said hinge member.

8. A grill as defined in claim 7 wherein alternate ones of said projections extend in opposite directions out of the plane of said hinge member.

9. A grill as defined in claim 1 wherein that portion of said upstanding flange of said bowl section contacted by said hinge member when said cover section is in its open position relative to said bowl section is of increased area than adjacent portions of said upstanding flange.

* * * * *

UNITED STATES PATENT OFFICE
CERTIFICATE OF CORRECTION

Patent No. 4,062,340          Dated December 13, 1977

Inventor(s) George L. Huff

It is certified that error appears in the above-identified patent and that said Letters Patent are hereby corrected as shown below:

Col. 1, line 57, after fragmentary, insert -- view --.

Col. 3, line 52, after second, insert -- hinge --.

Col. 4, line 51, "width" should be -- wide --.

Col. 4, line 68, "in" should be -- is --.

Col. 5, line 2, "cove" should be -- cover --.

Col. 6, line 27, after portion, insert -- pivotally --.

Col. 6, line 40, "generaly" should be -- generally --.

Col. 6, line 64, "respet" should be -- respect --.

Signed and Sealed this

Fourth Day of April 1978

[SEAL]

Attest:

RUTH C. MASON
Attesting Officer

LUTRELLE F. PARKER
Acting Commissioner of Patents and Trademarks